May 28, 1946.    L. L. SCHAUER ET AL    2,401,276
TRIPPING MECHANISM
Filed May 22, 1945    2 Sheets-Sheet 1
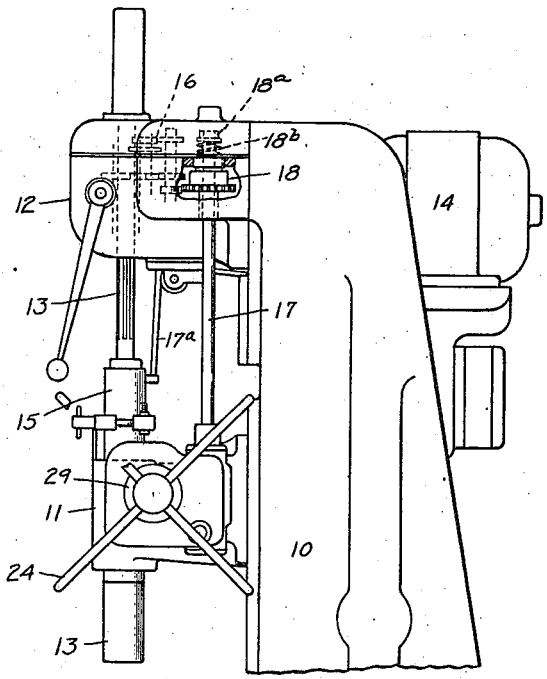
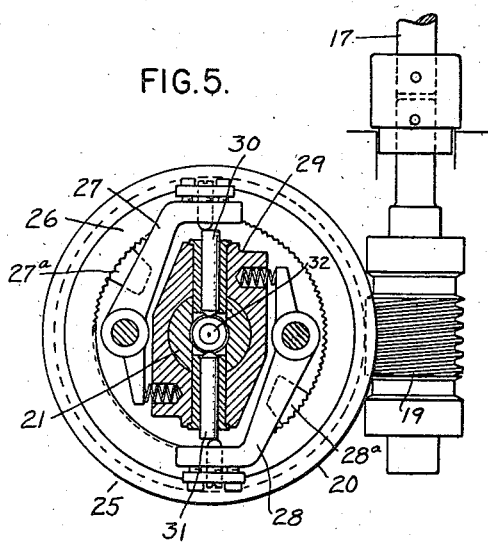
INVENTORS
Lawrence L. Schauer
John H. McKewen
BY Albert F. Nathan
ATTORNEY May 28, 1946. L. L. SCHAUER ET AL 2,401,276
TRIPPING MECHANISM
Filed May 22, 1945 2 Sheets-Sheet 2
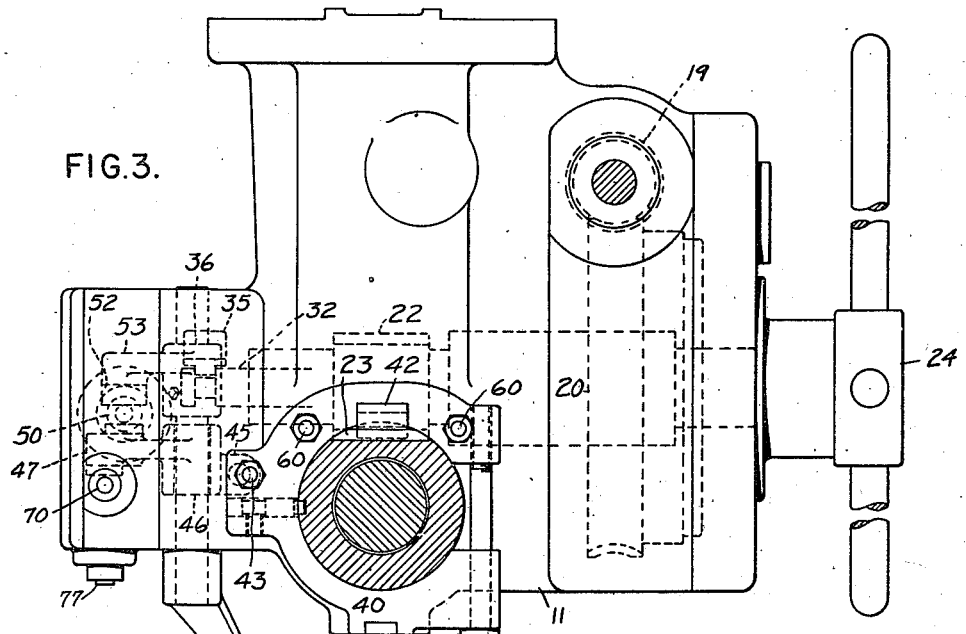
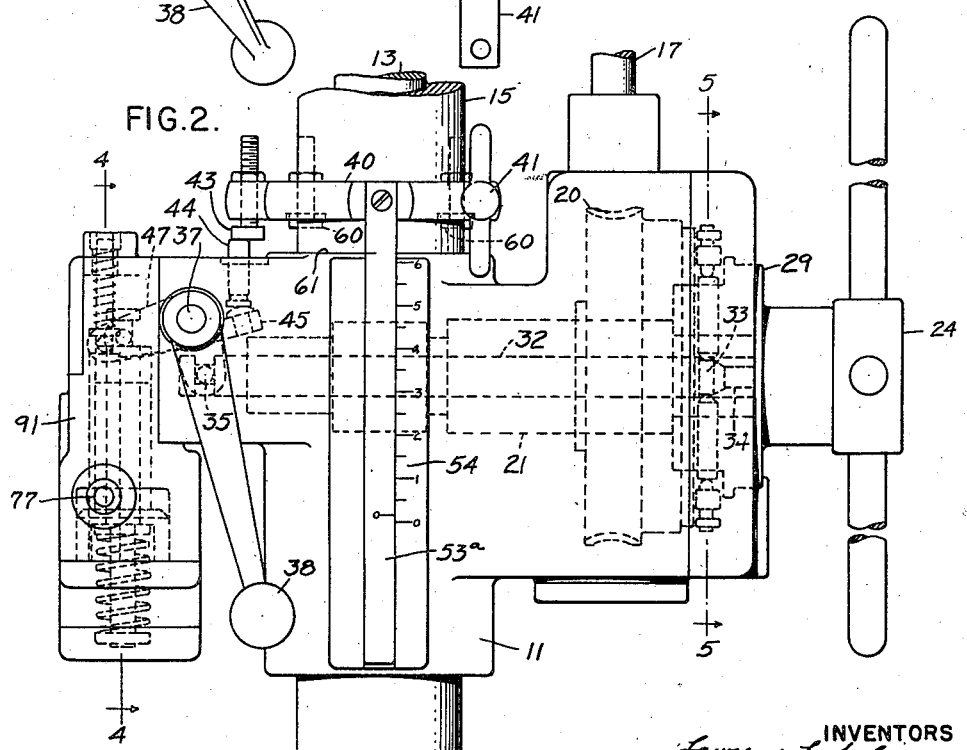
INVENTORS
Lawrence L. Schauer
John H. McKewen
BY
Albert F. Nathan
ATTORNEY.

UNITED STATES PATENT OFFICE 2,401,276

TRIPPING MECHANISM

Lawrence L. Schauer, Wyoming, and John H. McKewen, Cincinnati, Ohio, assignors to The Cincinnati Bickford Tool Company, Cincinnati, Ohio, a corporation of Ohio Application May 22, 1945, Serial No. 595,090

2 Claims. (Cl. 77—34)

The present invention relates to power-feed throw-out devices and is concerned more particularly with an improved form of mechanism, especially adapted for drilling machines and the like, for bringing the spindle to a definite stop and thereafter automatically disengaging the power-feed.

A primary aim of the invention is to render available a mechanism that will hold the spindle at a predetermined depth of its travel for a limited period of time, at the expiration of which the power-feed mechanism is automatically disengaged whereupon the spindle may be retracted. In the usual operation of machines to which this invention is applicable, the spindle carries a tool that is rotated and simultaneously advanced axially into the work. Any point on the tool therefor inscribes a helical path, the convolutions being closely or widely spaced in accordance with the rate of feed or axial travel per revolution. A stopping of the forward feed, followed by an immediate reversal in the axial travel, necessarily leaves the bottom surface of the work that was engaged by the tool, in a helically sloped plane, and in consequence a part that later is to be fitted or assembled on such surface, such as a bolt head, does not seat evenly thereon and becomes subjected to considerable one-sided stress. This invention aims to provide a simple means for bringing the tool spindle to a full stop at the precise point required, and after the spindle has made a few revolutions while in that stopped position, automatically to disengage the feed and thereby permit the spindle to be retracted.

A further aim of the invention is to provide a delayed acting trip mechanism that may be embodied in, or supplied as an auxiliary to, the conventional power feed mechanism of a machine tool, and when embodied, rendered effective or ineffective at will. For certain tooling operations, such as through drilling, a dwell period is not required, but in other tooling operations, such as spot facing, counter boring, a delayed reverse is essential if the bottoms of the recesses are to be finished in a level plane. With the aid of this invention, the operator has available several means for throwing out the power feed, and may readily select the character of feed throw-out that is suitable to the job at hand, i. e., automatic throw-out on reaching a given depth, or a delayed throw-out that functions after a time interval following the reaching of a given depth. When the latter condition obtains, much time and manual attention of the operator is saved and definite assurance is had that the spindle and tool will have revolved, at the fixed level, at least the minimum number of times and the bottoms of the recess or recesses finished plane, before the pressure on the tool is released and before it becomes possible to retract the spindle.

Still a further object of the invention is to enable the operator to vary the time interval elapsing between the stopping and the tripping out of the power. In most machines and materials worked upon therewith, there occurs a certain amount of spring and wind-up, and in order that the spring and wind-up may be absorbed and dissipated after stopping the forward advance of the tool and before reverse translation thereof can occur, the invention aims to provide a means whereby an adequately long dwell period at the fixed depth may be obtained to the end of allowing the materials to relieve themselves of compressive forces incident to the tooling operations and, in the case of the workpiece, to receive its final finish operation in a substantially normal condition.

A preferred manner of carrying out the objectives of this invention is to incorporate in the power feed train a friction coupling and a feed clutch in series, and to provide the spindle with an adjustable stop device that positively stops forward travel of the tool at a given point. Prior to the positive stopping, however, the forward motion of the spindle is arranged to set in action a clutch throwout mechanism, which operates, in the case where a dwell period is required, subsequent to the stopping of the forward travel of the spindle, automatically to disengage the power feed clutch. The adjustable stopping device preferably includes two relatively adjustable abutments, the one for initiating the delayed trip mechanism and the other for effecting the positive stopping. Moreover by appropriately adjusting the abutments as a unit and independently, it is possible with this invention to obtain a power-feed throwout at a selected tool depth with or without a dwell period.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings illustrates a side view of the upper portion of an upright drilling machine embodying the invention.

Fig. 2 is a front view of the head portion of the machine illustrating portions of the power feed and tripping mechanism.

Fig. 3 is a plan view, partly in section, of the elements shown in Fig. 2.

Fig. 4 is a sectional view of the tripping mechanism, taken substantially along lines 4—4 of Fig. 2.

Fig. 5 is a view of the power-feed clutch taken substantially along lines 5—5 of Fig. 2.

Fig. 6 is a fragmentary view illustrating the setting of the parts in effecting a positive stop and delayed tripping out of the power feed.

Referring more particularly to Figure 1 of the drawings the invention is illustrated in connection with an upright drilling machine that has a column 10, a tool slide 11 and transmission housing 12 mounted thereon. The work table, base, and lower portions of the machine are not illustrated, as such portions are of conventional design and well known, Patent No. 2,022,437 being illustrative. The tool spindle 13 is adapted to carry a tool (not shown) at its lower end, and is rotated by the motor 14 through the medium of gears, shafts and connections journaled in the transmission housing 12 and the upper column portions. The spindle rotating train is conventional and may follow that of the aforesaid patent if desired.

The tool spindle 13 is rotatably journaled in a translatable sleeve 15 supported in the tool slide 11, and the power for effecting downward translation of the sleeve and the spindle is taken off the spindle in the transmission housing 12. The dotted line elements 16 diagrammatically represent parts of the feed train that conveys the power from the spindle to a feed shaft 17. In this train there is interposed a friction slip coupling, indicated at 18, that is made up of inter-leaved discs held in power transmitting engagement by spring pressure. The coupling, which is similar in principle to that disclosed in the Klausmeyer Patent No. 1,976,944, is set to transmit a predetermined torque, but may be adjusted to suit different load factors as will be understood.

Shaft 17 is coupled to a worm 19, journaled in the tool slide, which continuously meshes with a worm wheel 20 that is normally loose on a pinion shaft 21. The inner end of the pinion shaft 21 carries a rack pinion 22 that meshes with rack teeth 23 cut into the spindle sleeve 15, and the outer end of the pinion shaft has a four-handled wheel 24 secured thereto and by means of which the spindle may be raised and lowered manually. Power down feed of the spindle occurs when the power feed clutch 25, illustrated more clearly in Fig. 5, is engaged. The clutch is similar to that shown in the patent to Schauer et al., No. 2,022,437 and comprises essentially an internal saw tooth ring 26 mounted to and carried by the gear 20, and movable complementary clutch lever elements 27 and 28 that are pivoted to a flanged member 29 that is fixed to the pinion shaft 21. The levers 27 and 28 carry, offset therefrom, toothed clutching elements 27ª and 28ª which are normally spring pressed out of engagement with the teeth of the clutch ring 26. Radially extending pins 30 and 31 slidably mounted in the flanged member 29, engage the free ends of the clutch levers 27 and 28, and when the pins are cammed outwardly, the clutch levers are rocked outwardly and their offset portions engage the teeth of the clutch ring 26, and the worm wheel becomes locked to the pinion shaft.

The outward movement of the pins 30 and 31 is controlled by a centrally mounted cam shaft 32 which has high and low portions 33 and 34 connected by an inclined surface. The cam shaft is axially shiftable within a bore formed in the pinion shaft, and its end opposite the power feed clutch is engaged by one arm 35 of a clutch shifter lever 36 that is pinned fast to a rock shaft 37. The outer end of the rock shaft 37 carries a hand lever 38, by means of which, through the connections described, the power feed clutch may be engaged and disengaged by hand.

Figs. 2, 3 and 4 illustrate more particularly a preferred form of tripping mechanism for automatically disengaging the power feed clutch at a selected point in the spindle travel. As before indicated the clutch tripping device of this invention affords the machine operator with a choice between instantaneous, delayed, or manual tripping out of the power feed. With regard to the instantaneous tripping, the mechanism therefore includes an adjustable stop collar 40 secured to the spindle sleeve in a selected position by means of a clamp screw 41. A shouldered rack dog 42 engages the rack teeth 23 and overlaps the collar 40 and positively holds the collar against upward movement on the spindle sleeve, for reasons later to be explained.

The collar 40 carries an adjustable trip screw 43 located such as to engage the upper end of a pin 44 that is vertically slidable in the tool slide 11. The lower end of the pin 44 engages one arm 45 of a two-arm lever 46 that is loosely mounted on the rock shaft 37. The other arm 47 of the lever 46 carries a pin 48 that projects laterally into a slot 49 formed in a plunger 50 near the upper end thereof. The other side of the plunger is notched out to form a step 51 that underlies, and is normally spaced from, a projection 52 carried at the side of a lever 53. Lever 53 in conjunction with lever 35, form the bell crank lever 36, previously referred to, which is operatively connected to the shiftable cam shaft 32.

Assuming that the power feed clutch is engaged, and the spindle is feeding downwardly, the trip screw 43 which is threaded into the collar 40, will engage and depress the pin 44 and rock the lever 45—46—47. Lever 47, after taking up the lost motion at 49, lifts the plunger 50 until the step 51 on the latter engages the projection 52, and further movement, effects a rocking of the clutch actuating lever 35—36—53 and a withdrawal movement of the cam shaft 32. The clutch pins 30, 31 slide from the high portion 33 to the low portion 34 of the cam shaft and the power feed clutch becomes immediately disengaged. In consequence, forward feed by power is suspended and the spindle may be retracted, either by the pull of its counterbalance mechanism 17ª, or by the manipulation of the hand wheel 24. As shown most clearly in Fig. 2, the trip collar 40 carries a depth gauge bar 53ª on which a zero line is scribed, which, in cooperation with the fixed scale 54, provides the operator with convenient means for determining where to clamp the trip collar so as automatically to trip out the power feed on reaching a predetermined point.

In combination with the foregoing described tripping mechanism, the invention embraces a means for effecting a delayed tripping out of the power feed. The mechanism for effecting such a result includes positive stop screws 60 also threaded into the collar 40, a slide valve 70, and a trip plunger 80. When a delayed trip is desired, stop screw 43 is adjusted upwardly, and trip screw 60 downwardly, from the position illustrated in Fig. 2, to a position as illustrated in Fig. 6. As the spindle travels downwardly, the head ends of the screws 60 engage a finished surface 61 on the tool slide and positively stop further forward travel of the spindle. The relative adjustment given to the screws 43 and 60 is such that the trip screw 43 will have depressed the pin 44 approximately half its normally available distance by the time spindle stopping occurs. As the spindle travel stops the friction coupling 18 yields, but nevertheless keeps the feed pressure on the drive and maintains the spindle against the fixed stop, the rack dog 42 meanwhile positively prevents slipping of the collar 40. The tool carried by the spindle continues to revolve at that fixed point and the surface of the work is machined plane. By adjusting nut 18a, the power of the friction coupling 18b may be varied, and in that way the maximum pressure available to feed the tool as well as to hold the spindle steady against the fixed stop 61, may be controlled.

To insure that the power feed will be tripped out on the elapse of a limited period of time following the stopping of the forward travel of the spindle, thereby to permit spindle retraction, the trip plunger 80 is caused to function. The plunger 80 is in the form of a piston and has its head end operating in a cylinder 75, and its rod end extending from the cylinder to a position underlying the projection 52 of the clutch lever 53. The piston and its rod are hollow and slidably encircle the trip plunger 50. When the stops 43 and 60 are adjusted to a position such as shown in Fig. 6, the partial depressing of the pin 44 by the screw 43 fails to bring the stop 51 of the plunger 50 into engagement with the projection 52 or to actuate the clutch lever 53, 36, 35.

The initial movement of the pin 44 does, however, shift the slide valve 70 upwardly part way, by virtue of the lateral connection 47a on the lever 47 therewith. The valve is grooved as at 71 and 72, and the shifting thereof closes off fluid supply channel 71, and opens discharge channel 72 to a cylinder port 73 and variable orifice discharge port 74 that communicate respectively with the cylinder 75 and a reservoir 76, shown by Fig. 4. The limited upward movement of the plunger 50, occasioned by the depressing of the pin 44, further compresses a normally loaded piston-actuating spring 81 located between the adjustable collared lower end 50a of the plunger 50 and the underside of the piston plunger 80. Liquid, preferably oil, in the cylinder 75 ahead of the piston thereupon proceeds to escape through ports 73, 72, and 74, to the reservoir. The rate of escape of oil is controllable by the adjustment of the valve 77, and as the rate of escape determines the rate of upward travel of the piston plunger 80, a time period elapses before the upper end 81 of the plunger 80 actuates the projection 52 sufficiently to rock levers 53—36—35, and effect withdrawal of the clutch controlling cam shaft 32 to thereby disengage the power feed. During such time period, the spindle is being held by power against the fixed stop 61 and the work surface is being accurately leveled by the tool.

The device is reset for the next cycle by shifting the power-feed control lever 38 to the position illustrated in Fig. 2. This movement rocks bell crank lever 36, which engages the power feed clutch, and also depresses the piston plunger 80. Simultaneously, a compression spring 90, encircling an extension of the slide valve 70, operates to reset the valve, to reset plunger 50, and to reset lever 45 and trip pin 44 to the positions illustrated in Figs. 2 and 4. When the valve 70 is reset fluid from the reservoir 76, freely enters an axial port 78 in the valve and flows through radial port 79, groove 71, and port 73 to the interior of the cylinder.

As illustrated more clearly in Fig. 2, the valve 70 and trip plunger 80 and their respective cylinders and fluid channels, reservoir etc. are housed in a housing 91 that is suitably secured to the side of the tool slide 11. By so constructing the delayed tripping mechanism, the unit is a separate assembly and may be embodied as such, to a tool head without severe alteration or reconstruction of the latter.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereby, by Letters Patent of the United States:

1. A drilling machine having a translatable spindle, a transmission normally operative to translate said spindle including a clutch and a serially arranged friction slip-coupling and means for rendering said clutch effective, combining spindle translation stopping means comprising opposed relatively adjustable abutment elements, and clutch disengaging means comprising a piston and a cooperating cylinder element, resilient means for urging the piston in one direction, means for limiting the rate of movement of said piston including a normally ineffective rate control valve, means operatively associated with the spindle for rendering said valve effective prior to the engagement of said opposed abutments, and means responsive to the resulting movement of said piston for disengaging said clutch.

2. A positive-drive rotator; a spindle rotated thereby; an impositive translator for the spindle; a positive arrester therefor; a fluid controlled releasor for the rotator arranged to be loaded by the spindle as it is about to be arrested in its translation; and a valve adjustable to determine the rate of unloading of said releasor.

LAWRENCE L. SCHAUER.
JOHN H. McKEWEN.